US008099189B2

(12) United States Patent
Kaznov et al.

(10) Patent No.: US 8,099,189 B2
(45) Date of Patent: Jan. 17, 2012

(54) BALL ROBOT

(75) Inventors: Viktor Kaznov, Uppsala (SE); Fredrik Bruhn, Uppsala (SE); Per Samuelsson, Mariestad (SE); Lars Stenmark, Trosa (SE)

(73) Assignee: Rotundus AB, Uppsala (SE)

( * ) Notice: Subject to any disclaimer, the term of this patent is extended or adjusted under 35 U.S.C. 154(b) by 1161 days.

(21) Appl. No.: 11/666,421

(22) PCT Filed: Nov. 1, 2005

(86) PCT No.: PCT/SE2005/001633
§ 371 (c)(1),
(2), (4) Date: Apr. 27, 2007

(87) PCT Pub. No.: WO2006/049559
PCT Pub. Date: May 11, 2006

(65) Prior Publication Data
US 2008/0097644 A1    Apr. 24, 2008

(30) Foreign Application Priority Data

Nov. 2, 2004    (SE) ..................... 0402672

(51) Int. Cl.
B25J 11/00    (2006.01)
B25J 13/00    (2006.01)
B25J 9/18    (2006.01)
(52) U.S. Cl. ..................... 700/245; 700/47; 318/568.13; 318/568.12; 901/3; 901/6; 901/18; 901/23
(58) Field of Classification Search .................. 700/245, 700/47; 318/568.12, 568.13; 901/1, 6, 18, 901/23, 3
See application file for complete search history.

(56) References Cited

U.S. PATENT DOCUMENTS

| 3,798,835 | A  | * | 3/1974 | McKeehan | 446/442 |
| 4,501,569 | A  | * | 2/1985 | Clark et al. | 446/458 |
| 4,726,800 | A  | * | 2/1988 | Kobayashi | 446/458 |
| 5,533,921 | A  |   | 7/1996 | Wilkinson | |
| 6,227,933 | B1 | * | 5/2001 | Michaud et al. | 446/462 |
| 6,289,263 | B1 | * | 9/2001 | Mukherjee | 700/245 |
| 6,414,457 | B1 | * | 7/2002 | Agrawal et al. | 318/568.12 |
| 7,726,422 | B2 | * | 6/2010 | Sun et al. | 180/7.1 |
| 2008/0097644 | A1 | * | 4/2008 | Kaznov et al. | 700/245 |

(Continued)

FOREIGN PATENT DOCUMENTS

DE    295 07 026    8/1995

(Continued)

OTHER PUBLICATIONS

Abstract of DE 19617434 corresponding to DE 295 07 026, Aug. 31, 1995.

(Continued)

*Primary Examiner* — Thomas Black
*Assistant Examiner* — Wae Louie
(74) *Attorney, Agent, or Firm* — Young & Thompson

(57) ABSTRACT

Ball robot comprising a shell, a diametric main axle, at least one pendulum, and a drive mechanism comprising at least two drive motors, wherein the drive motors are arranged on the pendulum(s) in the vicinity of the inner surface of the shell. There is also provided a ball robot with a ball shaped shell, a diametric axle attached to the shell concentric with the main axis of rotation of the shell, and a drive mechanism located inside the shell and supported by the diametric axle, wherein the diametric axle is arranged to accommodate for dimensional changes of the shell along the main axis of rotation.

26 Claims, 18 Drawing Sheets

U.S. PATENT DOCUMENTS

2011/0060492 A1* 3/2011 Kaznov .......................... 701/27

FOREIGN PATENT DOCUMENTS

| | | |
|---|---|---|
| GB | 2 239 636 | 7/1991 |
| JP | 7287695 A | 10/1995 |
| WO | 9725239 | 7/1997 |
| WO | 9930876 | 6/1999 |
| WO | 2004006204 | 1/2004 |

OTHER PUBLICATIONS

Abstract of GB 2239636, Jul. 10, 1991.

European Search Report corresponding to EP Application No. 05797186.3 filed Nov. 1, 2005.

Japanese Office Action, mailed Apr. 22, 2011, in Application No. 2007-538863.

* cited by examiner

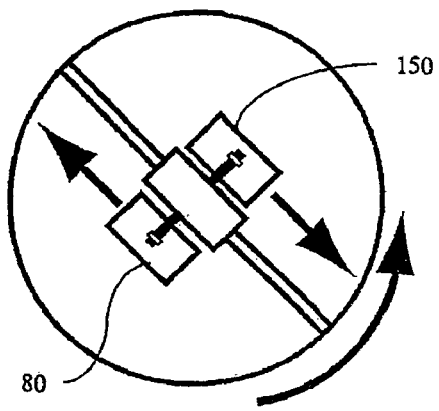
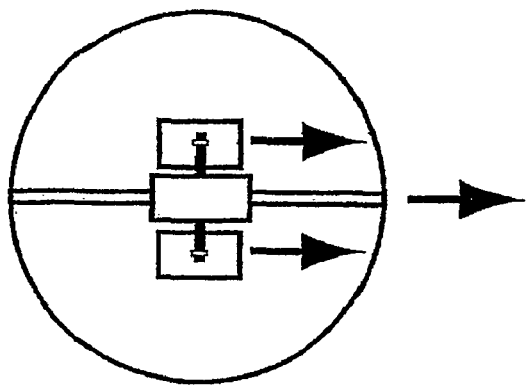
Fig. 7a  Fig. 7b
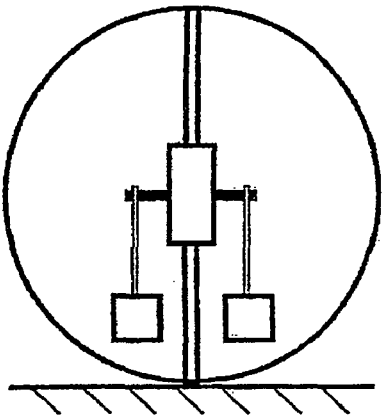
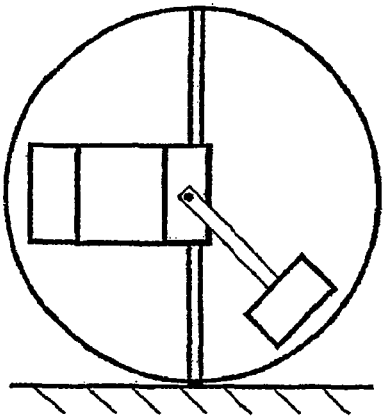
Fig. 7c  Fig. 7d
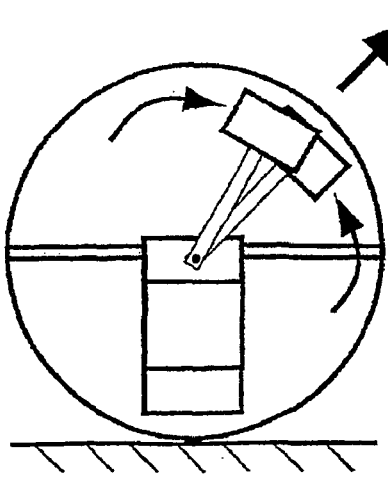
Fig. 7e

BALL ROBOT

BACKGROUND OF THE INVENTION

The present invention relates to an autonomous or controlled robot ball capable of moving in various environments, including indoors, outdoors as well as the planetary bodies such as planets and the Moon.

Upon designing a robot, the main difficulty is to make it sufficiently robust to sustain all environmental and operating conditions: shocks, stairs, carpets, various obstacles, radiation, thermal fluctuations, or direct manipulation of people or other robots, etc. The prior art wheeled robots can turn upside down and, then, be incapable of returning to the operational position. Other solutions to this problem are to use wheels bigger than the body of the robot, or a lever mechanism that can "flip" the robot in the right position. Alternatives to these solutions are to use a flat, rectangular shaped robot with tracks on each side, this will allow the robot to flip over and thus continue because of the tracks on both sides.

Yet an alternative and very competitive design is the ball robot concept as described in the following prior art patents: U.S. Pat. No. 6,227,933, U.S. Pat. No. 6,414,457, SE 517 699, DE 19617434, DE 19512055, DE 4218712 and WO 97/25239. Such a ball robot generally comprises a spherical shell and a drive mechanism enclosed in the shell. The locomotion principle of a ball robot is based on the disturbance of the system's equilibrium by moving its center of mass. By designing the drive mechanism such that it can rotate about the main axle 360 degrees in both directions, the displacement of the centre of mass brings the robot in motion back or forward, depending on the direction of rotation.

The prior art ball robots can be divided into two major groups:
  Pendulum type comprising a main axle connected diametrically to the shell and supporting a drive mechanism arranged to drive a ballast pendulum for rotation around the main axle.
  Shell drive type with a drive mechanism that is supported by and moveable along the shell inner surface.

Moreover the report "ARIANDA AO4532-03/6201, Biologically inspired solutions for robotic surface mobility" gives a good overview over prior art ball robots of both types. The designs disclosed therein comprises:
  ball robots of pendulum type with a telescopic main axle that makes it possible to alter the shape of the shell,
  a ball robot with a hollow main axle, used as housing for scientific instruments, and
  a ball robot of pendulum type wherein the main drive motor is placed in the pendulum and drives the pendulum for rotation about the main axle through a drive belt arrangement, thereby lowering the centre of mass for the robot.

Ball robots of shell drive type have a major drawback in the sense that they are particularly sensitive to shocks. In harsh terrain or by force applied from the outside, the driving mechanism is easily damaged.

Ball robots of pendulum type are therefore considered more robust, especially when the pendulum is short and thus the centre of mass high.

FIGS. 1 and 2 show an example of a prior art ball robot of pendulum type. The ball robot 10 comprises a spherical shell 20 enclosing a drive mechanism 30. The drive mechanism is supported by and arranged to rotate around a diametric main axle 40 attached to the shell at respective ends. Due to the displacement of the pendulum centre of mass when driven for rotation about the main axle, the ball robot is put into motion. Moreover, the robot may comprise additional equipment in the form of analysis, monitoring, or actuator systems. The shell may be a perfect spherical shape, and/or multi-facetted shell with from a minimum of 10 to 30 sides. The shell can be elongated or shaped in any way as long as one main axis that is suitable for rotation around is preserved. The outer surface of the shell can further be provided with a pattern to prevent the ball robot from slipping, sliding sideways or the like Drawbacks of such prior art ball robots of pendulum type is that the ability to traverse large obstacles, i.e. more than 25% of the radius in size from still standing is very low. Solutions with the centre of mass (CM) in the geometrical centre or close <15% of the radius from the geometrical centre of the ball robot will be limited in traversability because the ability to traverse is proportional to the ratio between the distance from the centre of the sphere to the CM to the sphere radius.

SUMMARY OF THE INVENTION

The object of the invention is to provide a new ball robot, which overcomes one or more drawbacks of the prior art. This is achieved by the ball robot as defined by the appended claims.

The present invention presents a complete robot system comprising a robot ball having good traversability and robust mechanics to operate both indoors, outdoors, in various terrains, bombed buildings, planetary bodies, etc. The robot ball comprises a telescopic main axle and has the ability to move in all directions from any given point. The presented robot system provides a ball robot with the mechanics and structure to sustain high level of autonomy, cameras, sun sensors, GPS, accelerometers, inclinometers, gyroscopes, battery charging, obstacle detectors, distributed systems, distributed intelligence, thin-film solar cells, thin-film sensors, microelectromechanical systems (MEMS), high-speed communication, interchangeable payloads, and sensors.

Another object of the present invention is to provide a robot ball comprising inclinometer, and GPS (other positioning system) to navigate autonomously over long distances while performing science, surveillance, etc.

This drive system comprises one or several electric drive motors for rotating the spherical shell about a telescopic/spring relieved axis. The steering system is made in such a way that it provides a possibility of motion in any direction from any single point of rotation.

The present invention makes the following significant advances, in the particular area of ball robots:
  Improved traversability (lowering the centre of mass).
  Movements in arbitrary directions and jumps.
  Resistance to large impacts (telescopic axle, spring relieved axle).
  Resistance to liquids, gas and aggressive chemicals (encapsulated shell).
  Communication and sensor devices (inside hollow main axle) facilitating drift monitoring and analysis, navigation and autonomous operations.
  Charging device including docking procedure.
  Sensor signal processing (image processing, speech processing, ultrasound array signal processing, radar signal processing, etc.) facilitating drift monitoring and analysis, navigation and autonomous operations.
  Simplified manual steering/navigation (statistical learning of the robot dynamics).
  Autonomy for various tasks such as obstacle avoidance, target/person detection and identification, verbal/gesture learning, action planning, world representation. (reinforcement learning, classifier systems, selectionist methods, speech and image processing).

SHORT DESCRIPTION OF THE FIGURES

Figure 4A:
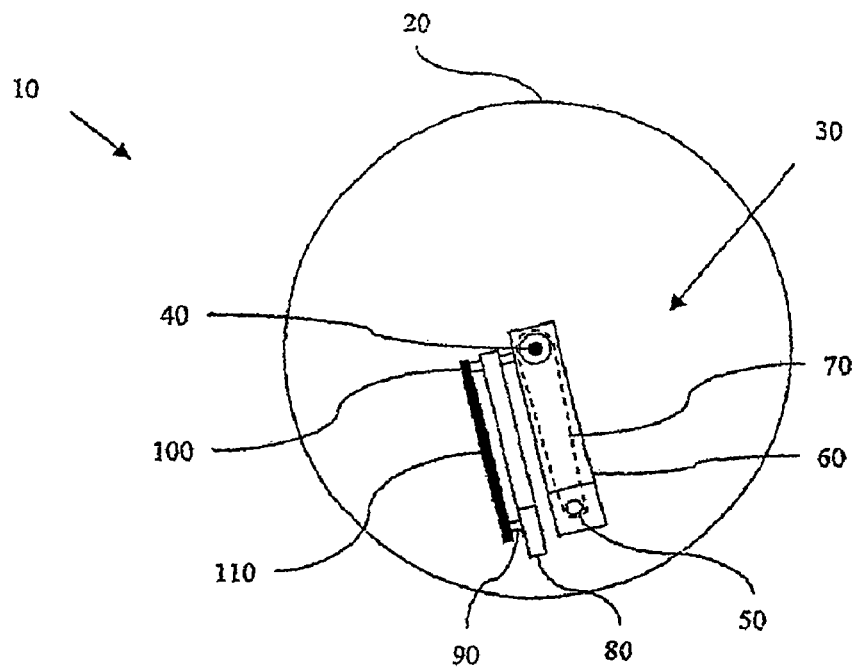
Figure 4B:
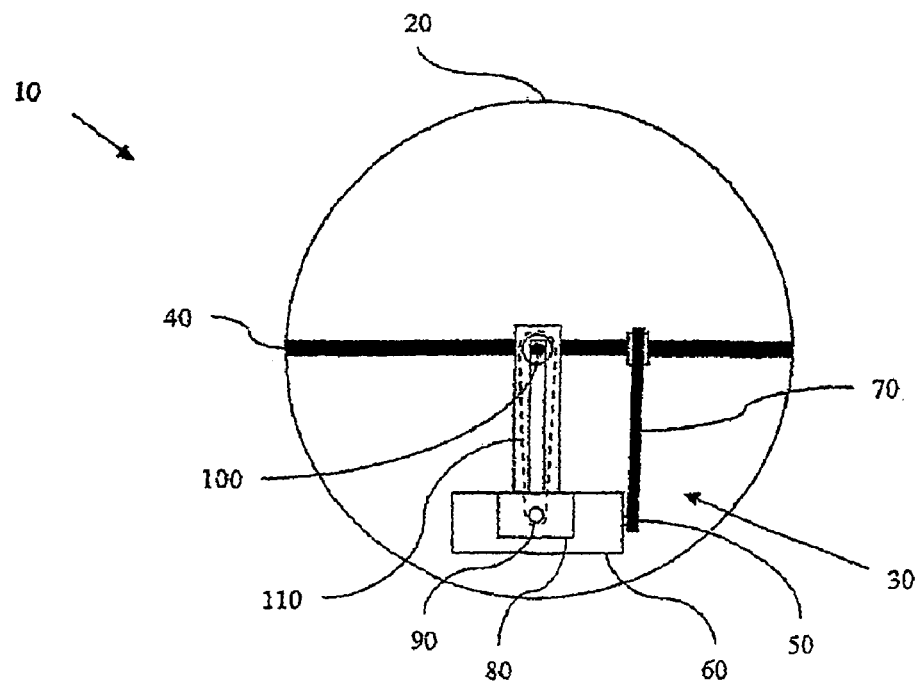
Figure 4C:
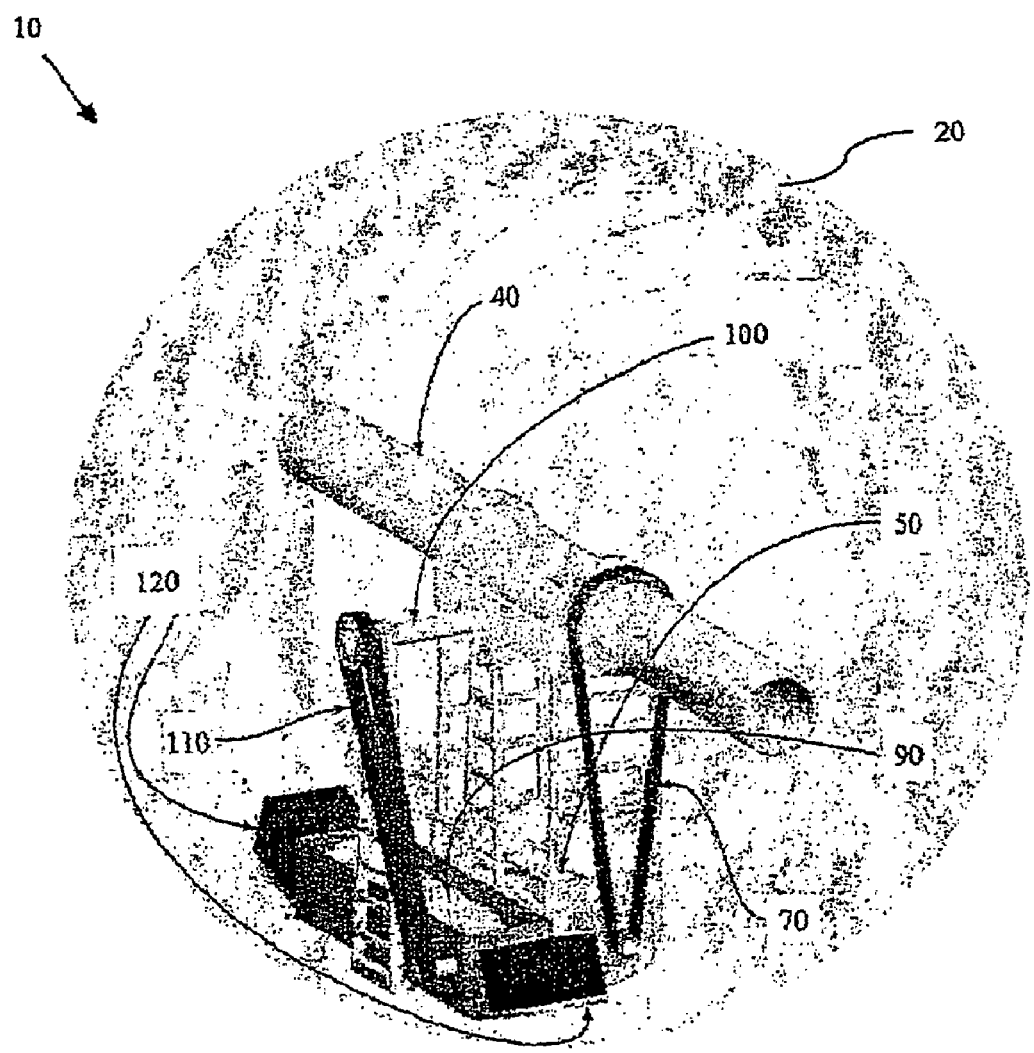

FIGS. 4a to 4c schematically show an embodiment of a ball robot according to the present invention.

Figure 5A:
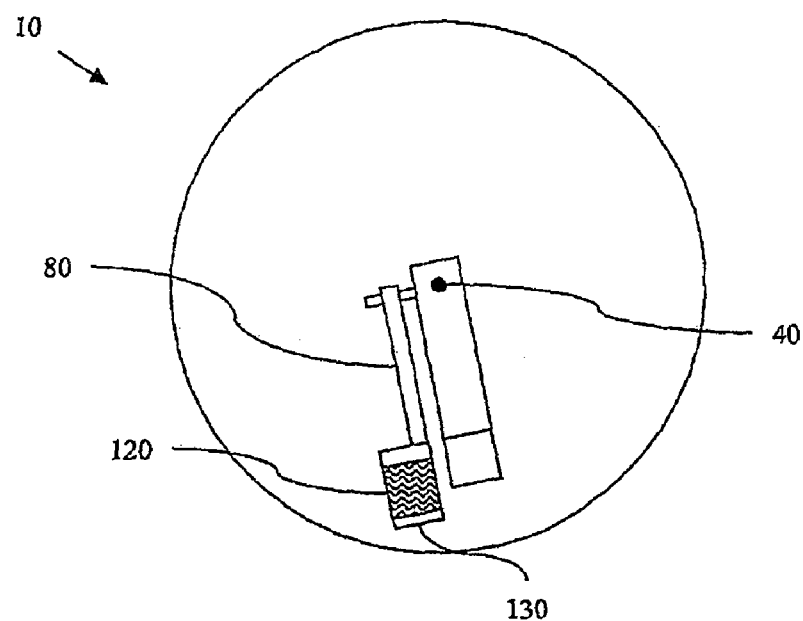
Figure 5B:
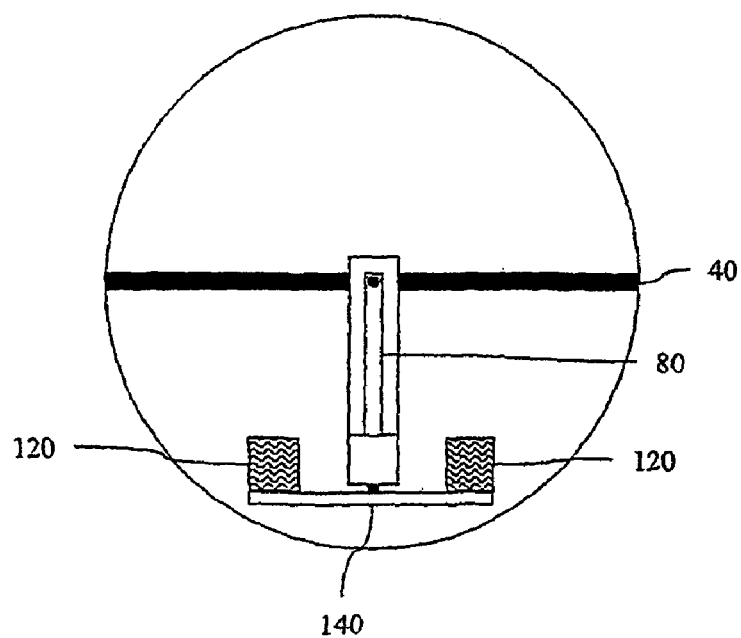

FIGS. 5a and 5b schematically show an embodiment of a ball robot according to the present invention.

Figure 6:
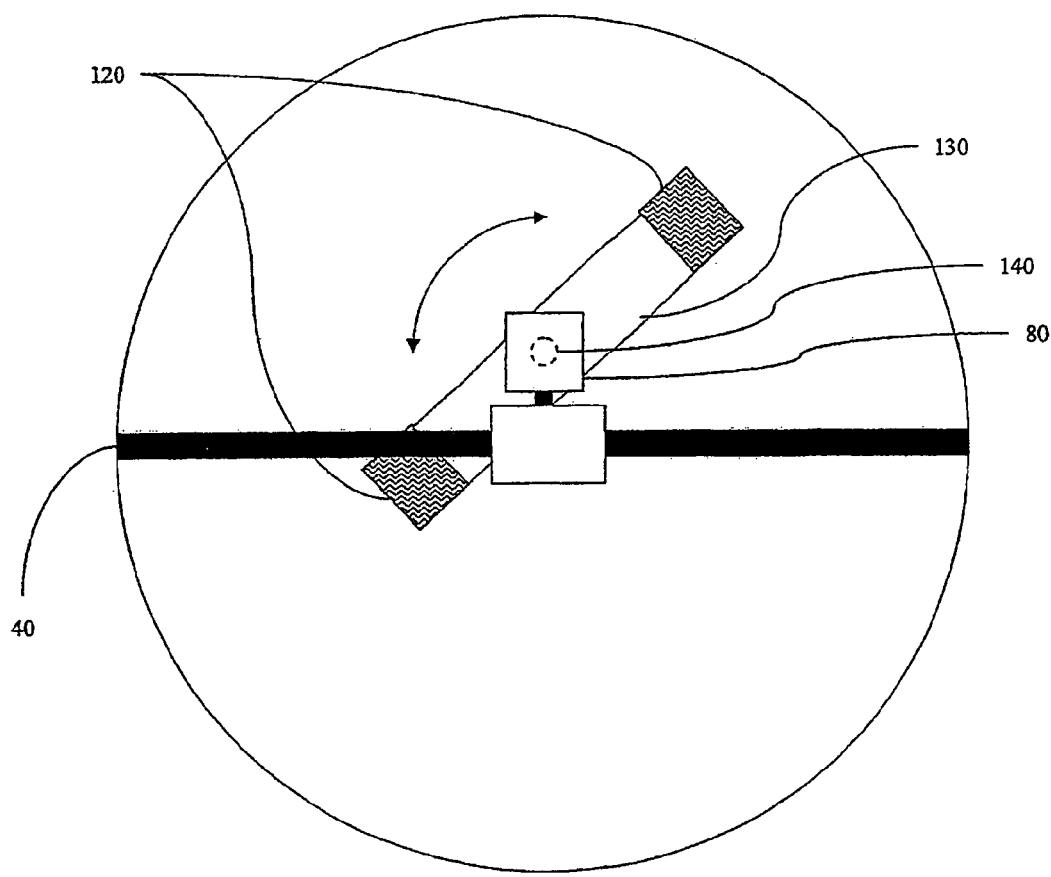

FIG. 6 shows the working principle of the embodiment shown in FIGS. 5a and 5b.

FIGS. 7a to 7e show the working principle of an embodiment of a ball robot according to the present invention.

Figure 8A:
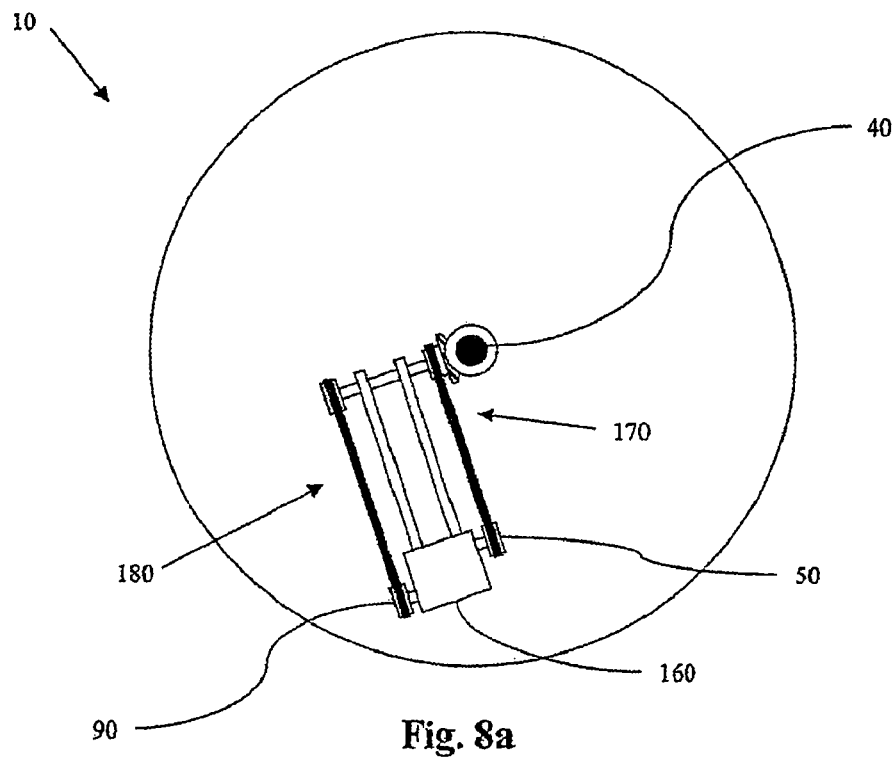
Figure 8B:
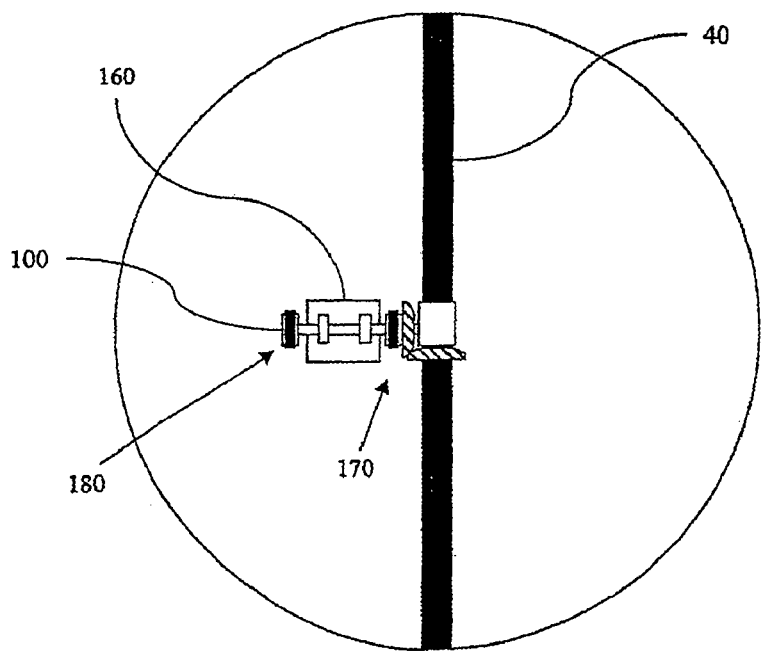

FIGS. 8a and 8b schematically show an embodiment of a ball robot according to the present invention.

Figure 9A:
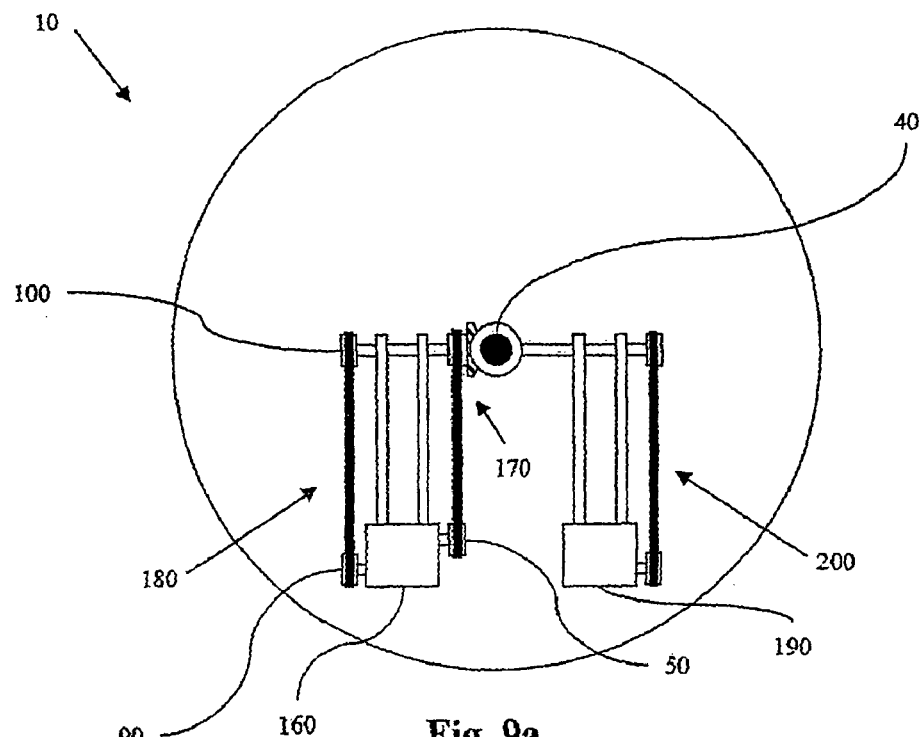
Figure 9B:
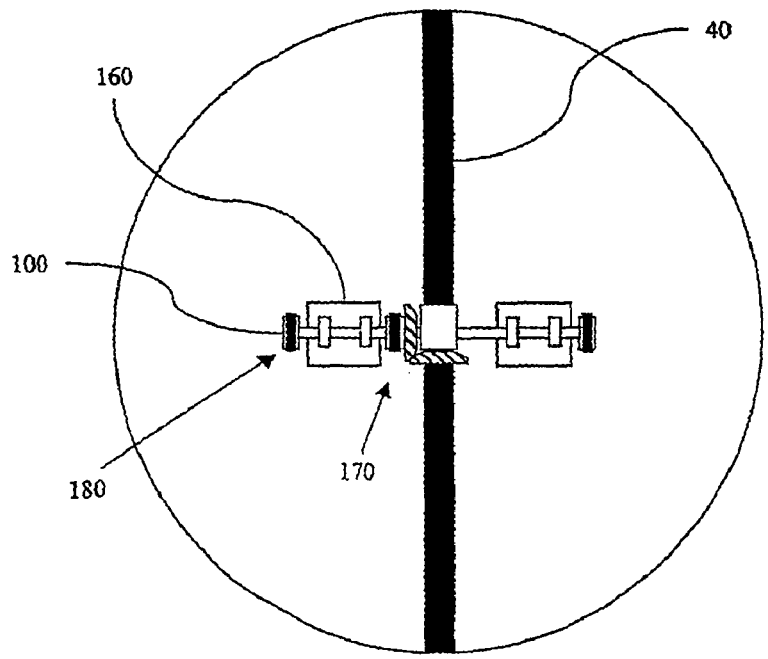

FIGS. 9a and 9b schematically show an embodiment of a ball robot according to the present invention.

Figure 10A:
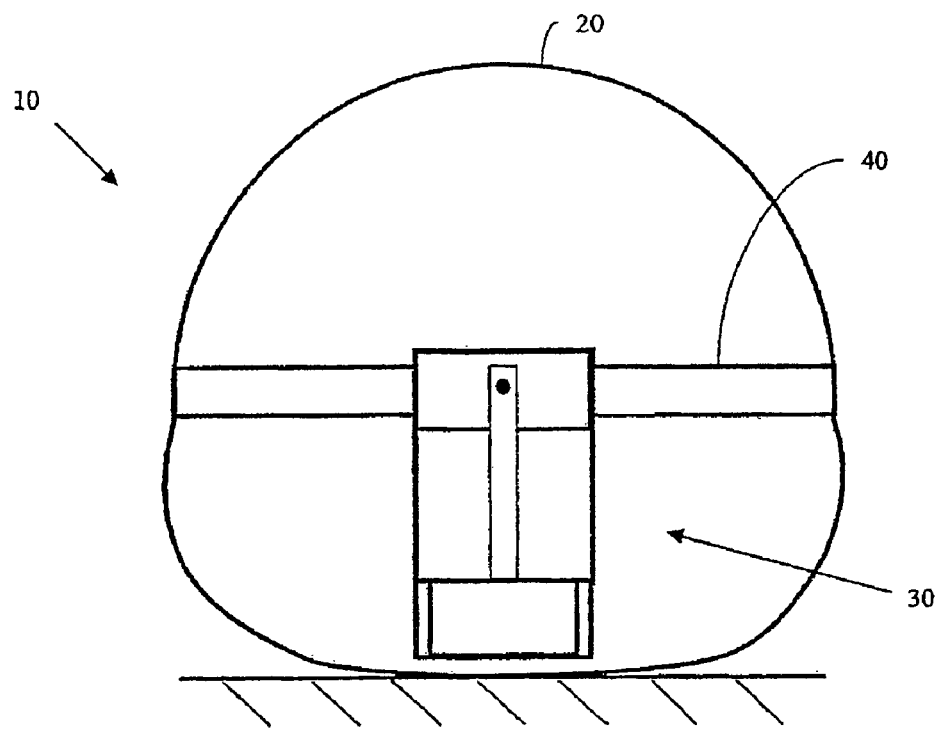
Figure 10B:
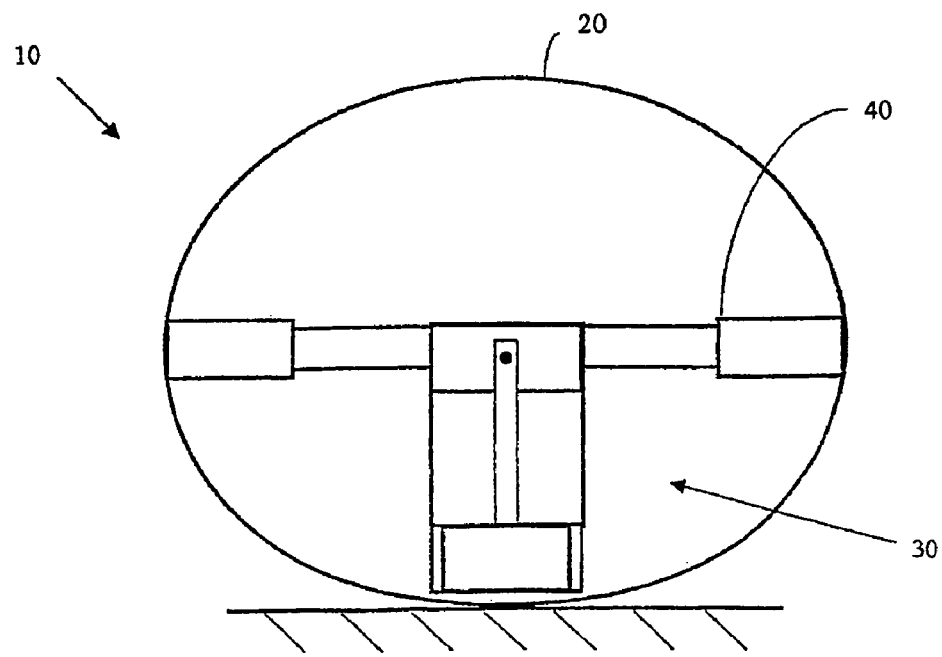

FIGS. 10a and 10b schematically show an embodiment of a ball robot according to the present invention.

Figure 11:
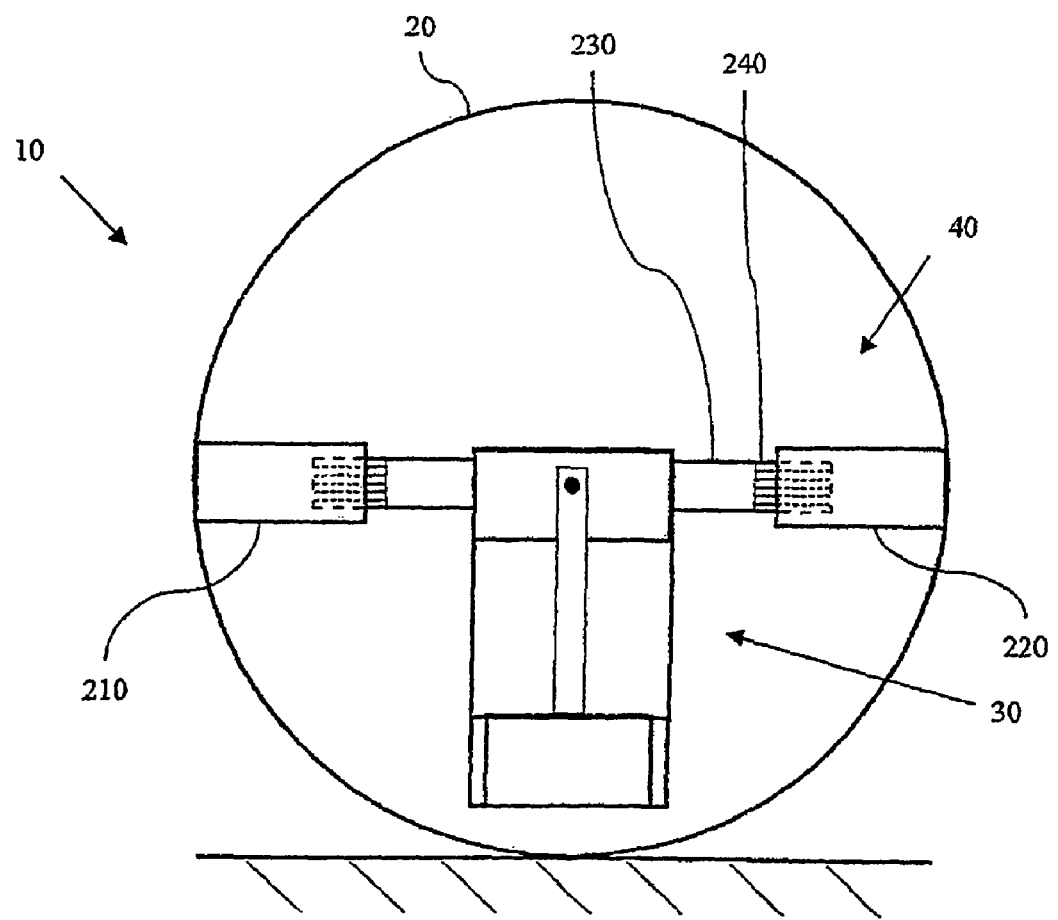

FIG. 11 schematically shows an embodiment of a ball robot according to the present invention.

Figure 12:
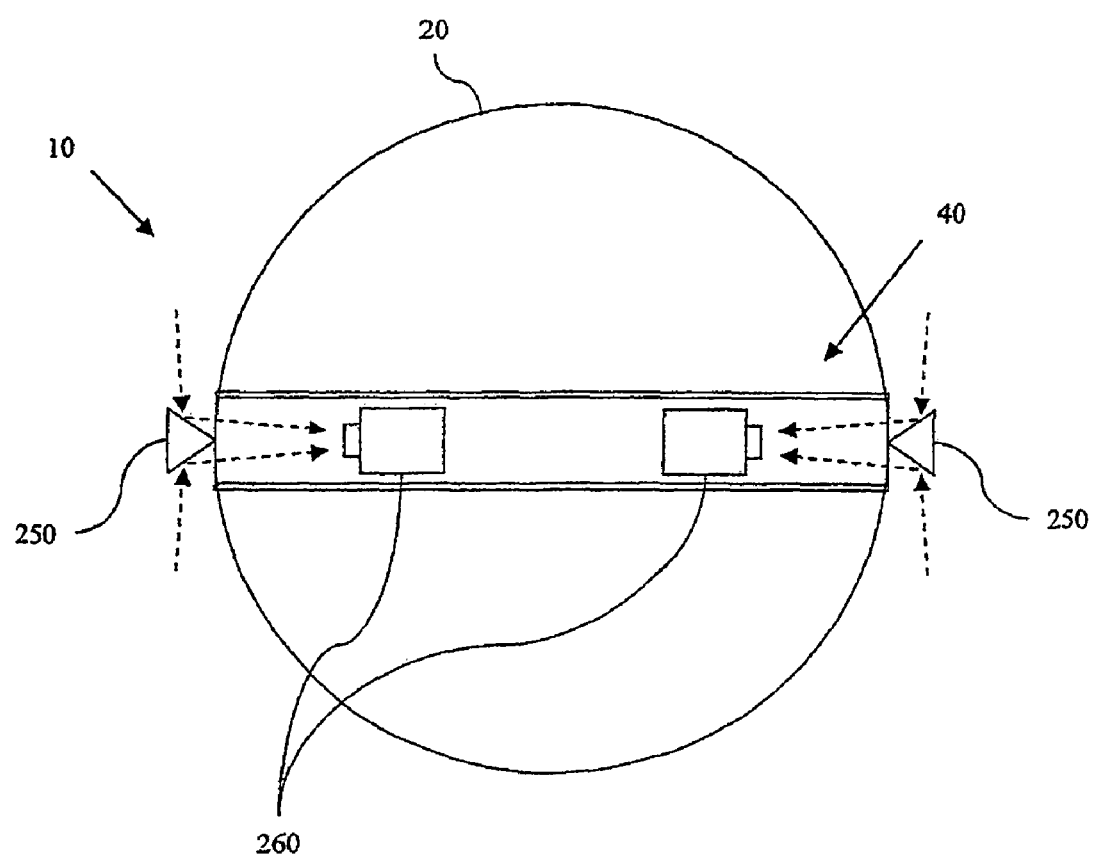

FIG. 12 schematically shows an embodiment of a ball robot according to the present invention.

Figure 13:
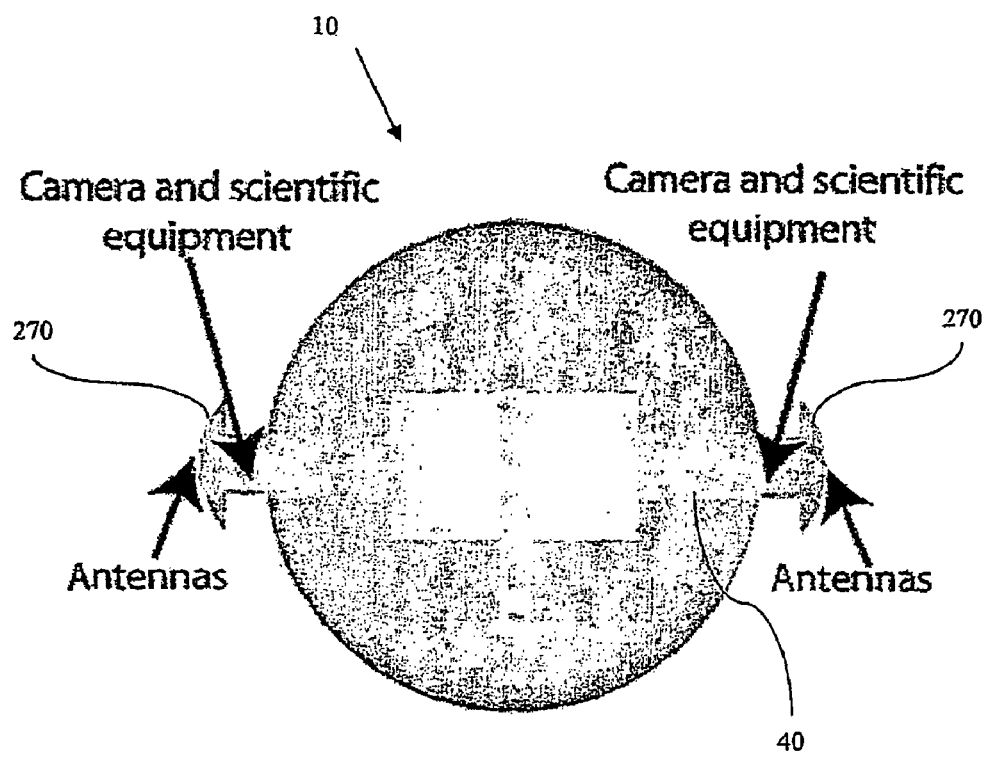

FIG. 13 schematically shows an embodiment of a ball robot according to the present invention.

Figure 14:
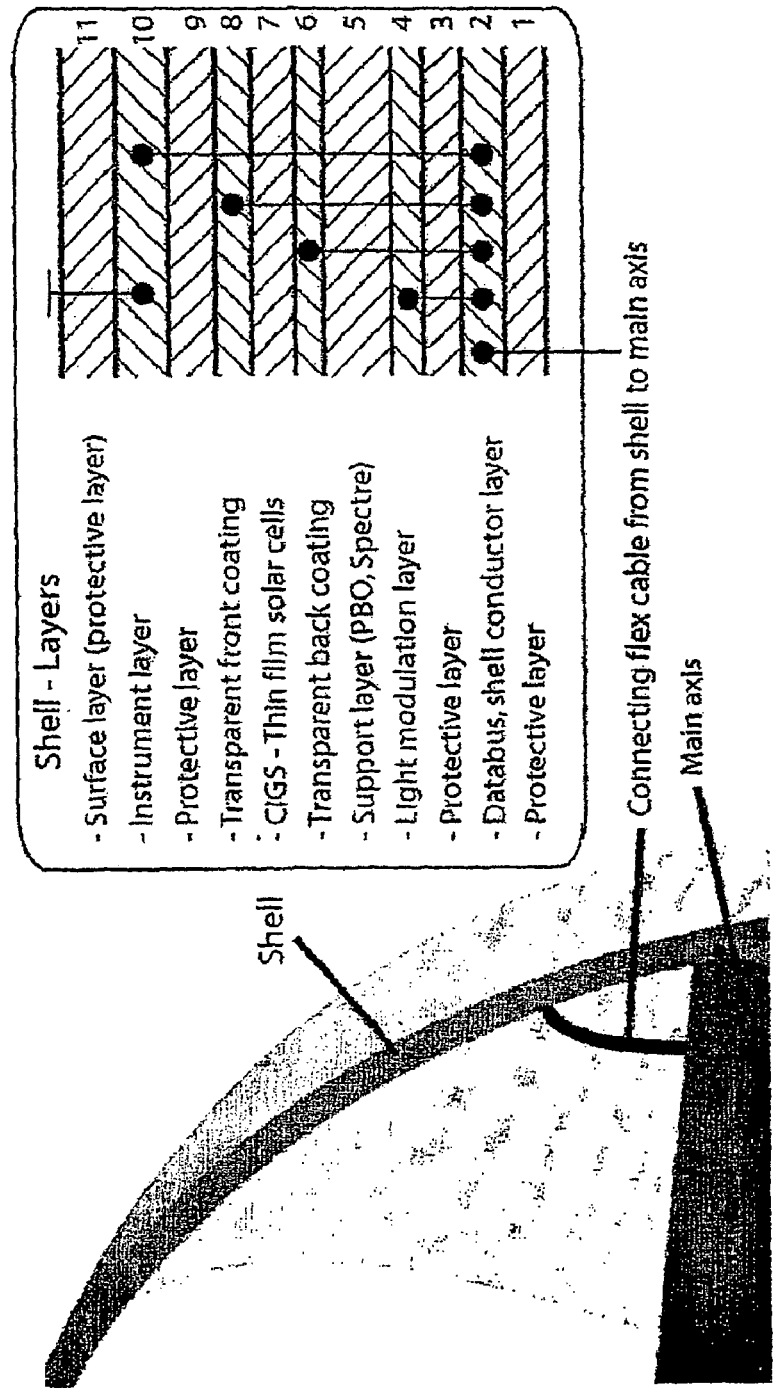

FIG. 14 schematically shows one embodiment of a shell for a ball robot according to the present invention.

Figure 15:
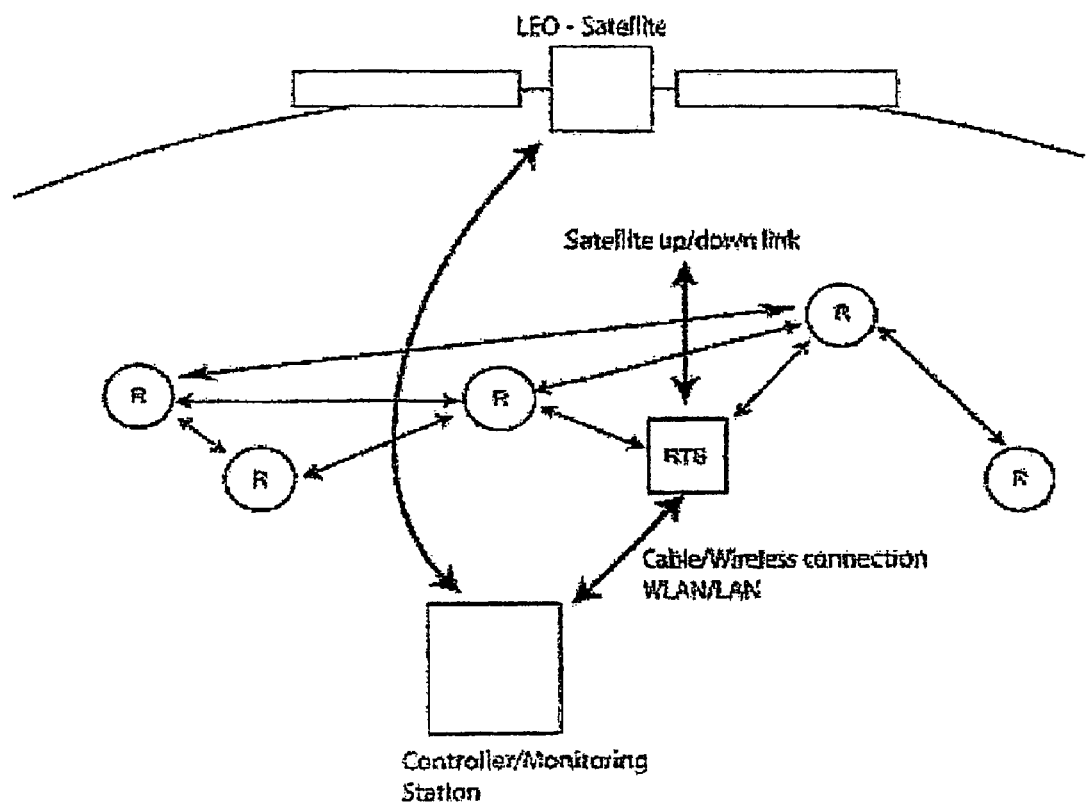

FIG. 15 shows a communication architecture of the ball robot system according to the present invention.

Figure 16:
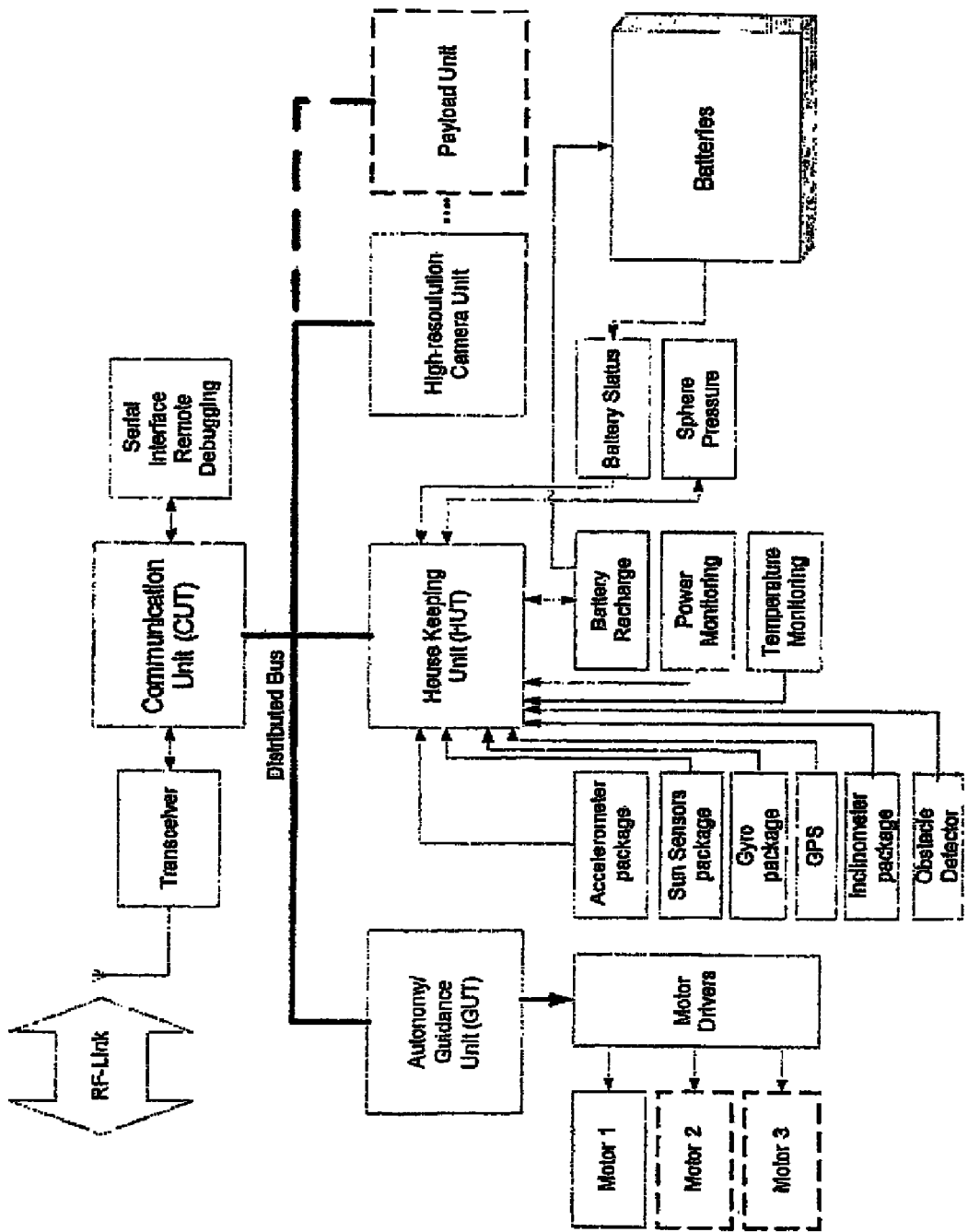

FIG. 16 shows an embodiment of interior electronics of the ball robot according to the present invention.

Figure 17:
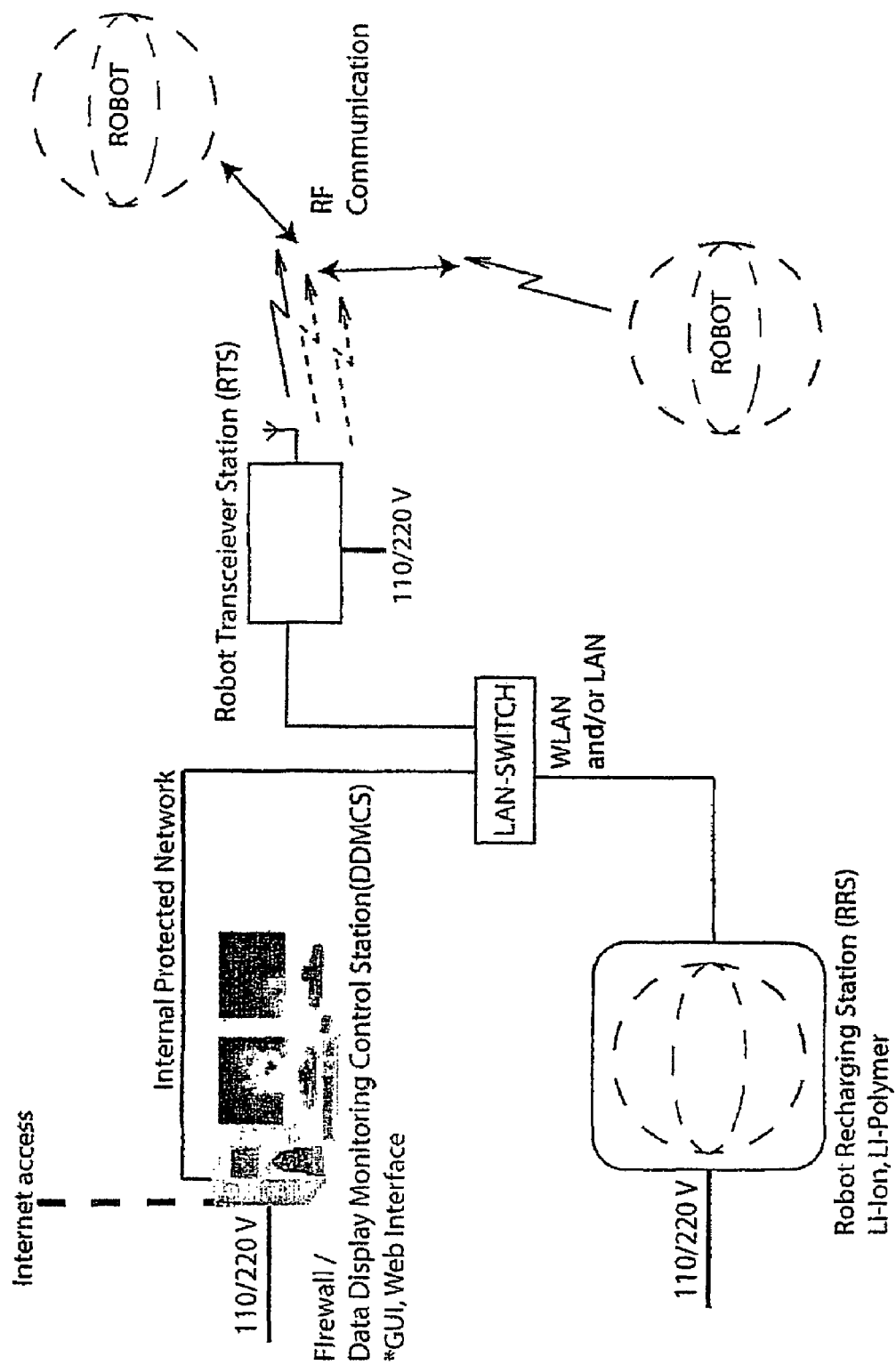

FIG. 17 illustrates one embodiment of a complete ball robot system according to the present invention.

Figure 18:
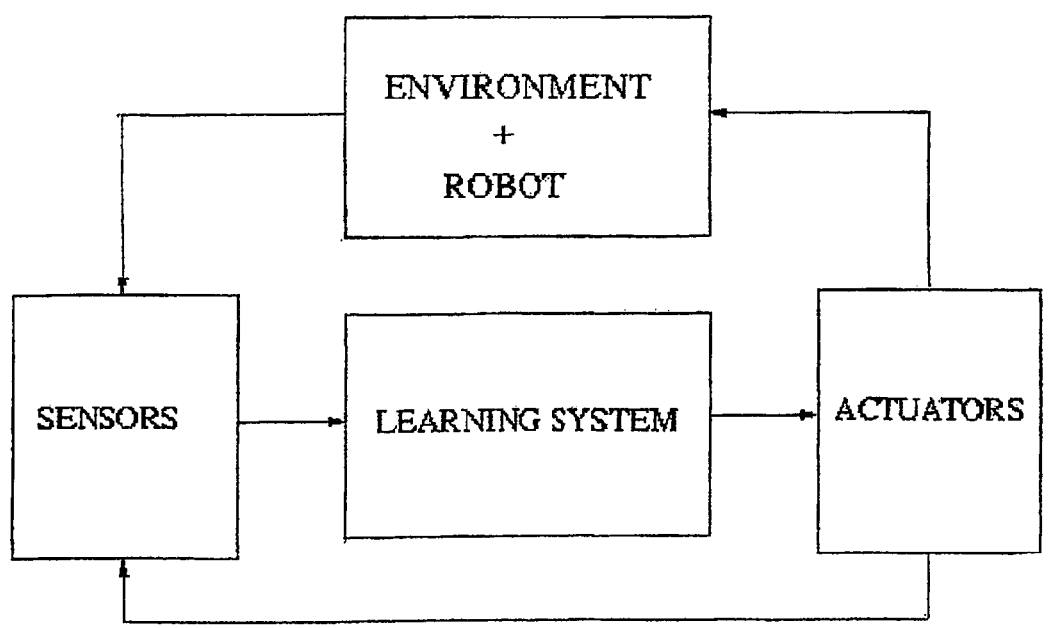

FIG. 18 illustrates a basic configuration of a self-learning ball robot system for ball robot system according to the present invention.

DETAILED DESCRIPTION OF THE INVENTION

A ball robot of the ball robot system according to the present invention comprises one or more of the following features:
- spherical or nearly spherical encapsulating shell with a hollow main axis;
- a mechanical driving unit situated inside the shell;
- a battery power supply system inside or outside the shell;
- a wireless communication unit including one or several antennas for transmitting and receiving data to and from one or several base stations.
- a computer processing unit for storing, receiving and transmitting data,
- a house keeping sensor unit for sensing, collecting and transmitting measurable physical quantities/changes inside the shell.
- a sensor system unit for sensing, collecting and transmitting measurable physical quantities/changes on or outside the shell.
- an actuator system unit for controlling the mechanical driving device and other actuators such as loudspeakers, video projectors, and other passive and active sensors (ultrasound, laser, sonar, . . . ).
- a sensor signal processing unit for signal processing of the sensor data delivered by the sensor systems.
- one or several learning modules for real-time autonomous adaptation and learning of the robot behaviour based on the sensor and actuator signals recorded.

Further, an external battery charging device of the ball robot system according to the present invention may comprise one or more of the following features:
- a wireless communication unit.
- an inductive charging device.
- a docking mechanism.

Still further, an external navigation and monitoring base station of the ball robot system according to the present invention may comprise one or more of the following features:
- a transmission and receiving unit that communicated with the robot apparatus platform (its wireless communication unit).
- a display unit that continuously processes and visualizes significant data transmitted from the robot apparatus platform.
- a navigation unit comprising a conventional joy stick connected to one of several antennas that communicates with the robot apparatus platform and its mechanical control system unit.
- an action unit that allows a manual operator activate the different actuators onboard the robot apparatus platform.
- one or several learning modules that allow different forms of robot learning based on the data transmitted and received from the robot.

Specific embodiments of the above features will be described below.

In the earlier works it has been shown that the position of the center of mass (CM) plays the critical roll for the traversability of a spherical robot. The lowering of the CM closer to the shell is therefore very important and the ratio σ is defined as:

$$\sigma = \frac{l_{cm}}{R}$$

Figure 1:
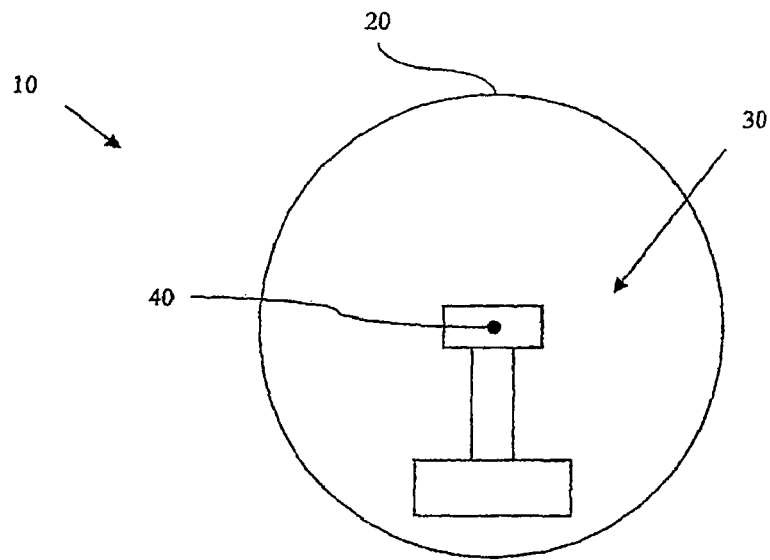
FIG. 1 is a schematic cross sectional side view of a general ball robot of pendulum type.
Figure 2:
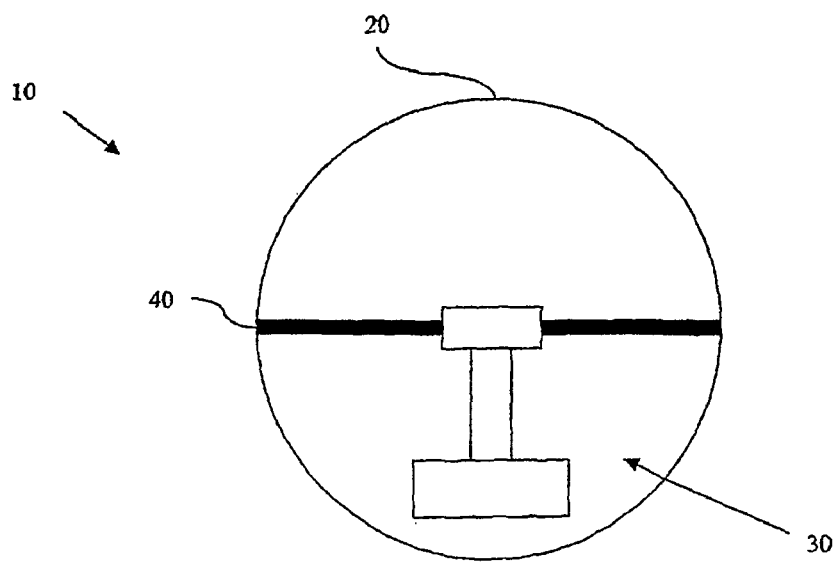
FIG. 2 is a schematic cross sectional front view of a general ball robot of pendulum type.
Figure 3:
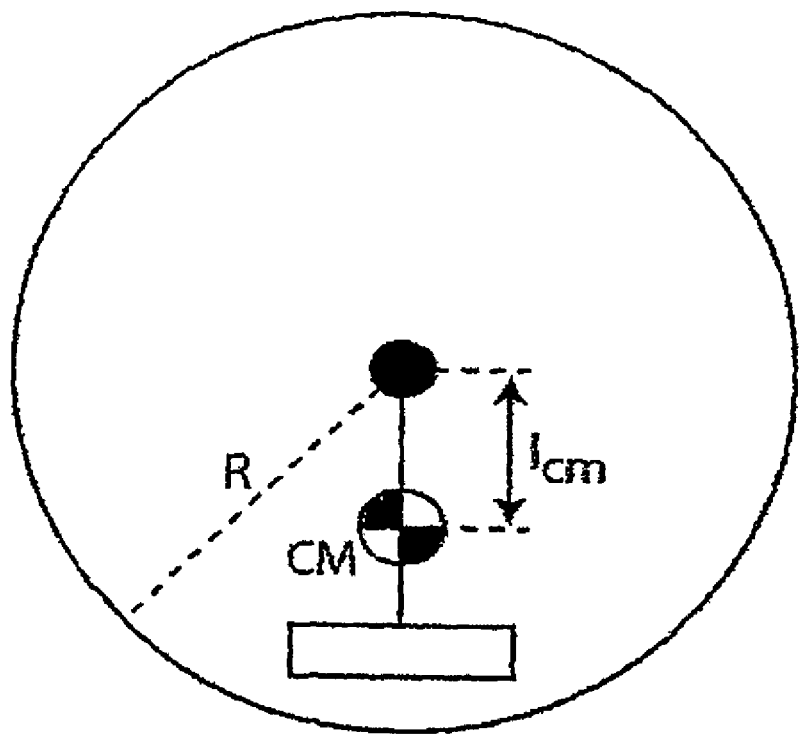
FIG. 3 illustrates the relation of $1_{cm}$ and R for a general ball robot of pendulum type.

FIG. 3 illustrates the relation of $1_{cm}$ and R. With the present invention, ratios σ of at least 50% and up to 95% and more can be achieved. Depending on the required performance ratios σ in the intervals:

50%≦σ≦55%
55%≦σ≦60%
60%≦σ≦65%
65%≦σ≦70%
70%≦σ≦75%
75%≦σ≦80%
80%≦σ≦85%
85%≦σ≦90%
90%≦σ≦95%
σ>95% can be advantageous. Where a higher ratio σ results in improved traversability. However, due to the general design of ball robots of pendulum type lowering of the CM is not easily done, preserving robustness and functionality of the robot.

In accordance with one embodiment of the present invention there is provided a ball robot with a high ratio σ, by lowering the CM. This is achieved by placing the driving unit/s (motors or some other type of driving system) hanging down as close to the shell of the robot as possible. Hence, the ball robot according the present invention comprises a shell, a diametric main axle, at least one pendulum, and a drive mechanism comprising at least two drive motors, wherein the drive motors are arranged on the pendulum(s) in the vicinity of the inner surface of the shell.

The ball robot according to the present invention is of pendulum type with a drive mechanism arranged to drive one or more pendulums for rotation about a diametric main axle. One embodiment is shown in FIGS. 4a and 4b. The drive mechanism 30 comprises a primary motor 50 driving the drive mechanism 30 for rotation about the diametric main axle 40. As mentioned above, the primary motor 50 is arranged at the lower portion of a primary pendulum 60, in the vicinity of the inner surface of the shell 20 in order to lower the CM. The primary pendulum 60 is rotatably supported by the diametric main axle 40 at the upper end, and the primary motor 50 is arranged to drive the primary pendulum for rotation about the main axle 40 by a primary transmission arrangement 70. The primary motor 50 may be an electric motor and the primary transmission arrangement 70 can be any suitable transmission arrangement, such as a belt, a chain, or an axle arrangement and the like. Further, the transmission arrangement 70 can be a hydraulic transmission arrangement or the like. The primary motor 50 is the main power source for driving the ball robot 10 for rotation in the forward and backwards direction.

The drive mechanism further comprises a secondary pendulum 80 and a secondary motor 90 for driving the secondary pendulum 80 for rotation about a secondary axle 100 transverse to the main axle 40 and attached to the primary pendulum 60. The secondary pendulum 80 is mainly utilized as a steering means, as rotation in either direction will make the robot 10 ball turn in that direction as the CM will move in that direction. The possibilities for the secondary pendulum 80 to influence the movement of the robot ball 10, depends on the weight and the centre of mass for the secondary pendulum 80, hereafter referred to as torque (where high torque for a pendulum is equal to high weight and low CM at rest). Preferably, the secondary pendulum 80 has as high torque as possible, compared to the primary pendulum 60, whereby optimal controllability is achieved. In order to increase the torque of the secondary pendulum 80, the secondary motor 90 is arranged at the lower portion of the secondary pendulum 80, in the vicinity of the inner surface of the shell 20. The secondary motor 90 is arranged to drive the secondary pendulum 80 for rotation about the secondary axle 100 by a secondary transmission arrangement 110. The second transmission arrangement 110 can be of any type as described for the primary transmission arrangement. Preferably, the secondary pendulum 80 is formed such that it can be rotated 360 degrees around the secondary axle 100.

By controlling the primary and secondary motors 50, 90 it is possible to place the centre of mass (CM) at any angle around the vertical line passing through the centre of the robot 10 and the point of contact with the ground.

FIG. 4c shows a more detailed example of the embodiment of the ball robot according to the present invention as disclosed in FIGS. 4a and 4b.

In order to further increase the torque of the secondary pendulum 80, other parts of the robot's drive mechanism and control system 120 are arranged at the lower portion of the secondary pendulum 80, in the vicinity of the inner surface of the shell. Such parts may include a power supply (battery), a main computer, unit and the like. Preferably, all, or nearly all such parts and units should be placed on the secondary pendulum.

According to one embodiment shown in FIGS. 5a and 5b, as much as possible of the secondary pendulum mass 120 is placed on a rotation element 130 being rotatable about the lateral axis 140 of the secondary pendulum 80. The rotation element 130 is driven for rotation by a rotation motor preferably arranged on the rotation element 130, in order to maximise the turning torque of the rotation element. Rotation of the rotation element 130 will make it possible to change the main direction of travel (defined by the main axle) while the robot 10 is stationary. As is indicated in FIG. 6 the rotation of the stationary robot ball 10 is achieved by rotational acceleration of the rotation element 130, whereby it exercises a torque in the lateral direction of the secondary pendulum 80 that will result in a rotation of the ball robot 10. The acceleration may either be positive or negative (deceleration).

According to one embodiment, the ball robot according to the present invention comprises a drive mechanism with two secondary pendulums 80, 150, arranged on the secondary axle 100, one on each side of the main axis 40. The two secondary pendulums 80, 150 are preferably balanced with respect to each other. In one embodiment, the two secondary pendulums 80, 150 are driven for synchronised rotation about the secondary axle 100, by one common drive motor.

Alternatively, each of the two secondary pendulums 80, 150 are independently driven for rotation about the secondary axle by separate motors. Two independently driven secondary pendulums 80, 150 give a number of movement possibilities, such as shown in FIGS. 7a to d:

a. stationary rotation, by acceleration in opposite directions,
b. sideways movement of the ball robot, provided that the secondary pendulums are rotatable 360 degrees about the secondary axis,
c. vertical arrangement of the main axle, top view
d. vertical arrangement of the main axle, side view
e. jump motion, by rotation of both pendulums in opposite directions and simultaneous retardation leading to a quick stop of the rotation with both pendulums pointing in the desired jump direction, also provided that the secondary pendulums are rotatable 360 degrees about the secondary axis.

According to one embodiment shown in FIG. 8, the ball robot according to the present invention comprises a drive mechanism with primary and secondary drive motors 50, 90 arranged on a single drive pendulum 160 in the vicinity of the inner surface of the shell 20. In this embodiment, the primary motor 50 is arranged to drive the drive pendulum for rotation about the main diametric axle 40 by a primary transmission arrangement 170 of bevel gear type or the like, the bevel gear arrangement being rotatably supported on the secondary axle 100. Like in earlier embodiments, the secondary motor 90 is arranged to drive the drive pendulum 160 for rotation about the secondary axle 100 transverse to the main axle 40 by a secondary transmission arrangement 180. Preferably, the drive pendulum 160 is rotatable 360° about the secondary axis 100.

In order to maximize the movability of this embodiment, there is preferably provided a second drive pendulum 190 like in the embodiment described above in association with FIG. 7. The double drive pendulum embodiment is shown in FIG. 9. The second drive pendulum 190 comprising a third drive motor 200 arranged in the vicinity of the inner surface of the shell 20, the third motor 200 being arranged to drive the second drive pendulum 190 for rotation about the secondary axle 100 by a third transmission arrangement. Due to the fact that this embodiment lacks the primary pendulum of the embodiment of FIG. 7, the movability of this embodiment is unsurpassed.

It's important to notice that the driving unit has no contact with the shell besides the contact with the diametric main axle via the transmission system. That makes the robot to an impact safe system. There are only two points where a direct impact could cause some damage. These are the attachment points of the main axle to the shell. The present invention solves this problem by offering two ways to make these points impact safe.

The main axle of the robot is telescopic with elastic joints.

The main solid and/or hollow axle is hanging on a number of elastic joints (resilient members in the form of springs, rubber) in the shell.

Moreover, by making the diametric main axle flexible in the longitudinal direction, the deformation of the shell upon impact can be controlled, i.e. the deformation of the shell is controlled to absorb impact forces by a predefined controlled deformation. Therefore one embodiment of the present invention is a ball robot with a ball shaped shell, a diametric axle attached to the shell concentric with the main axis of rotation of the shell, and a drive mechanism located inside the shell and supported by the diametric axle, wherein the diametric axle is arranged to accommodate for dimensional changes of the shell along the main axis of rotation. If the main axle 40 is a stiff axle that is firmly attached to the shell at two diametric points, then the impact force is absorbed by an uncontrolled local deformation of the shell as is illustrated in FIG. 10*a*. Whereas the impact deformation of the shell for the ball robot according to the present invention, is controlled to an ellipsoidal deformation as shown in FIG. 10*b*.

In one embodiment the main axle is provided with a damping function in order to absorb impact forces i.e. in order to avoid bouncing or vibrations in the shell. In another embodiment the degree of damping is controllable, so that the ball robot may have a bouncing mode and a damped mode as well as intermediate modes.

According to one embodiment, shown in FIG. 11, the telescopic axle 40 comprises two end sections 210, 220 being attached to the shell 20 and a mid section 230 carrying the drive mechanism 30, wherein the mid section 230 is arranged so that it cannot rotate with respect to the end sections, e.g. by splines 240.

According to still another embodiment, the diametric axle is a hollow tube being arranged to house additional sensor and/or actuator means (equipment) carried by the robot. The hollow tube may be fully enclosed inside the shell, or one or both of its ends may be arranged in communication with or as an extension of an opening in the shell, whereby any equipment housed in the tube will have direct access to the surrounding atmosphere or any other media that the robot is operating in. In one embodiment, the shell and the tube together form a closed structure enclosing an inner volume housing the drive mechanism, the inner volume being closed to the surrounding media. Hence, the drive mechanism in such an embodiment will work in a closed environment, and is therefore not exposed to reactive substances, dust or the like that may be present in the surrounding atmosphere or media. At the same time as scientific instrumentation or any other equipment that should be in contact with the surrounding environment can be placed in the hollow tube. The hollow axle allows the robot can operate in harsh environments, for example sand, snow, water, dangerous gases and/or liquids and have the ability to analyze them or any other object using sensors and/or actuators placed in the hollow axle. In one embodiment, the hollow axle has a circular cross sectional shape, but it may be of any suitable shape such as rectangular, polygonal, etc. In order to provide a flexible robot system, that can carry a number of different types of equipment, and to provide for simple exchange of equipment, the hollow axle is provided with a fastening structure and the additional equipment with a mating structure.

In order to keep the centre of mass as low as possible it is important that any additional additional equipment placed in the hollow axle is made as light as possible. Therefore, only the parts of additional equipment that have to access the surrounding atmosphere etc. are placed in the hollow axle and remaining parts of additional equipment are placed on the pendulum of the drive mechanism. Alternatively, parts of the additional equipment that can be provided centrally by the main system of the ball robot should be omitted from the additional equipment. According to one embodiment additional equipment should be arranged to be powered by the main power source in the robot, in order to avoid separate power sources for the additional equipment. In order to achieve maximum flexibility, the hollow axle can therefore be provided with a power source interface for conducting electrical power to the additional equipment. Such a power source interface then allows simple exchange of additional equipment. In the same manner, the main computer can be provided with an interface for communicating with the additional equipment, so that any processing needed by the equipment can be handled by the main computer. The communication interface can either be wireless or wire based with standardized interface connectors in the hollow axle.

Examples of sensors and actuators that can be placed inside the hollow main axle are;

Sensors:
Mine detectors
Gas sensors
Cameras
IR detector
UV detector
Noise detector
Mass spectrometer
RF-ID chip sensing/reading
Geiger Counters
Drug detection sensors
Etc.

Actuators:
Drills
Grips
Molds
Loudspeakers
Fire extinguishers
Flame throwers
Video projectors
Etc.

According to one embodiment, at least one camera is mounted inside the hollow axle with internal and external optics. Full field of view can be acquired by mounting mirrors at the end of or in the hollow axle, however outside the shell and thereby reflecting light into the hollow axle and to the camera optics. In the embodiment, shown in FIG. 12, the mirror 250 at the end of the axle 40 is designed as a cone and can therefore provide 360° full field of view to the camera/s 260 mounted in the hollow axle 40. Full field of view can also be enabled using fish eye lenses or any other wide field of view optics that is reflected into the hollow axle to the camera optics. At least one camera can also be fixed mounted on the end or in the hollow axle outside of the shell, with a fixed field of view, i.e. facing forward or in any direction of user choice. Stereoscopic vision can be achieved by mounting one camera on each end of the main axle.

According to one embodiment of the present invention, the diametric main axle 40 of the ball robot 10 is provided with extendable end caps 270. The extendable end caps 270 can house cameras or camera optics, antennas, scientific equipment, obstacle detection systems, etc. FIG. 13 illustrates one embodiment of extendable end caps 270. The end caps 270 does not have to cover the entire hollow main axle, neither do they require a hollow main axle. The end caps 270 can cover parts or whole of the hollow axle, they can further be extended outside the axle. Moreover, in the closed position, the extendable end caps 270 can be formed to seal off the interior of a hollow axle or the shell from the surrounding atmosphere or media. The end caps 270 can be extended and retracted by means of an electric motor and a gear arrangement or any other suitable drive arrangement such as pneumatics, hydraulics or the like.

If the shell is manufactured entirely from a conducting material or with at least one conducting layer, then any electromagnetic signals from the interior of the robot are shielded an cannot reach outside. In this case the communication antennas can be mounted on the exterior of the robot, and especially advantageously on the end caps. FIG. 13 shows one embodiment of dipole antennas mounted in a 45 degree tilt against each other on the end caps 270 in order to offer the best antenna diagram for communication both laterally and vertically.

According to still a further embodiment, the shell of the ball robot is a multilayer shell. A multilayered shell will have at least two layers and incorporates functions for thermal control and solar power of the robot. Examples of layers that can be included in a multi layer shell are: thin-film solar cells, variable emittance materials, thin-film sensors, thin-film actuators, etc. An example of a multilayered robot shell is shown in FIG. 14

According to one embodiment the ball robot system of the present invention provides an inductive charging system, comprising inductors connected to the power supply system in the robot and a charging station. However, in other embodiments, the robot ball may comprise contact surfaces for direct contact charging.

The communication architecture of the ball robot system is described in FIG. 15. Even though the robot system disclosed herein is of ball robot type, the general system can be used with other types of robots. At least one or more robots can be controlled using the Robot Transceiver Station (RTS). The RTS communicates with a Control/Monitoring Station computer using cable transmission or wireless transmission, (LAN, or WLAN at any available speed) or Low-Earth Orbit (LEO) communication satellites. The communication protocol for LEO satellites is modem-standard. Relaying satellites or higher orbits or planetary satellites can also be used. The communication system will use CCSDS standards for space applications. The spherical robots are able to communicate and relay data from other spherical robot, thus enabling a longer possible distance or redundant exploration/investigations.

According to one embodiment, the ball robot system comprises:
- Use of at least two spherical robots for multivariate sensor and/or actuator response, and/or data collection and/or data analysis.
- Use of at least two spherical robot for long range, and/or operation beyond transmission capabilities of the RTS and/or any single robot.
- High-speed data communication link between RTS, and at least one spherical robot and/or directly between at least two spherical robots with the purpose of distributing processing power for data analysis etc. . . . . . This could be that one robot transmits data to the RTS for fast analysis and the results are transmitted back to the robot. Or it could be manifested by one robot collecting data which is determined interesting and need fast analysis, which the single robot cannot provide and therefore transmits some of the work to a different robot for analysis.
- Spherical Robot control system with at least one re-programmable control device, (FPGA, MCU, etc. . . . ). This is typically a FPGA which have different functions during a robot deployment. During a guidance phase the reprogrammable device can be programmed to analysis guidance data and can be reprogrammed autonomously or on command to process other data.
- Spherical Robot internal electronics with distributed intelligence over a distributed bus. The spherical robot system can distribute computational power over several processing units connected over a distributed bus.

One embodiment of interior electronics of the ball robot according to the present invention is described in FIG. 16. The ball robot requires communication and guidance capabilities. This is implemented in at least one micro controller (MCU) or central processing unit (CPU) or field programmable gate array (FPGA) or Digital Signal Processor (DSP) and/or other digital logical device together with motor electronics. The present invention allow the electronics to be implemented in a distributed system, i.e. over several digital logical devices (distributed intelligence) operated over a distributed bus. However this is not required and the same set of functions and/or sensors can be implemented on a single CPU. In FIG. 16 this is illustrated in a set of units, where the communication unit is responsible for communication with other robots and/or RTS and/or satellites. The House Keeping Unit collects data from GPS receiver, Sun Sensors, Accelerometers, Gyroscopes, Inclinometers, Obstacle detectors, Power consumption, Temperatures, and any additional equipment with additional data sensing and/or sensor and/or actuator. The House Keeping Unit processes these data and feed the Guidance Unit with guidance inputs. The house keeping unit also control and/or monitors the battery recharge procedure or battery status during operation. The guidance unit controls at least one motor or more according to the guidance data, which can be both autonomously acquired or remotely controlled.

FIG. 17 illustrates one embodiment of a complete ball robot system, with a data/monitoring control station, a recharge station, Robot Transceiver Station, and spherical robots. The transfer of information between the RTS, data/monitoring station, charging station is made over a secure line using optical transmission, and/or LAN and/or WLAN at available speeds. The data/monitoring station monitors and controls both the charging station and the RTS. Recharging of the robots is made autonomously, where two modes are possible; the robot determines autonomously that a threshold limit has been reached and returns to the charging station. The second option is that the data/monitoring station either autonomously or on active command tells any or all of the available robots to return to the charging station.

The data/monitoring station have a Graphical User Interface (GUI) for control/monitoring of the complete system. An internet connection can be added to the data/monitoring station and in that mode the data/monitoring station can act as a web server for remote service of the robot system. The data/monitoring station will have firewall functions to protect the system from intrusion or un-authorized access. Connecting of the internet to the data/monitoring station allows the internal network to utilize the full set of IP-numbers, (that is with IP version 6, 1021 numbers/m2 of the surface of the Earth).

RTS and/or charging stations can be added to the system through the internal LAN/WLAN switch. Additional switches can be added to the internal LAN/WLAN switch to fulfil the connection need of RTS and/or charging stations.

All prior art ball robot systems comprise control systems based on analytical models of the robot behaviour in different situations. However, even though the geometry of this class of robots seems simple enough for all analytical systems, it has been found that the dynamic behaviour of ball robots is not always possible to predict in an analytical system and leads to nontrivial and computational demanding physical modelling of the robot dynamics (via analytical mechanics) for robot control. In order to overcome these drawbacks, the ball robot system according to the present invention comprises a set of learning modules/systems which are able to adjust different behaviours of the robot towards more successful overall performance. The basic configuration of a self-learning ball robot system is depicted in FIG. 18 where the learning system receives inputs via a sensor system and outputs actuator signals that implements physical actions of the robot via the novel mechanical system of the ball robot suggested herein.

The input variables to the learning system are measurements of all or a subset of estimates of the system variables. The estimates are obtained from noisy sensor readouts by means of Kalman filter type of state estimation algorithms.

Additional input variables are filtered sensor readings from various forms of sensors such as mine sensors, gas sensors, cameras, IR sensors, UV detectors, ultrasound transducers, noise detectors, mass spectrometer etc.

For supervised learning and reinforecement learning, the two main output variables of the learning system are directly connected to the two motors of the robot that control the position of the main pendulum and the steering pendulum relative to the robot reference system. In addition there may also be outputs that control actuators such as drills, grips, molds, loudspeakers, fire extinguishers, flame throwers, video projectors, camera position, camera focusing etc.

FIG. 18 is an overview of a learning module or system in the context of a ball robot. The sensor system collects and preprocesses information about the state of the environment and the robot. For conventional supervised learning, the environment encompasses not only the environment in which the robot operates but also the performance information provided by an external supervisor that is not part of the robot. The learning system may consist of one or several subparts/modules organized in a parallel and/or hierarchical manner.

Robot learning is a vast scientific field but in prior art, the solutions reported have been limited to conventional, non-spherical, robots. Many of the basic approaches to robot learning are applicable to ball robots but new aspects have to be taken into account in order to achieve a working system for the particular geometry and dynamics of ball robots. A list of important learning tasks for ball robots which is by no means comprehensive is:

1) Learning of ball robot dynamics
2) Learning to balance the main axis of the robot in a horizontal direction.
3) Learning to recognize the location of the robot
4) Learning to recognize objects/scenes/situations in the neighbourhood of the robot (perception).
5) Object avoidance learning
6) Learning to plan optimal paths through an environment.
7) Shadowing of a successful human ball robot remote control driver e.g. during path following.
8) Learning of internal geographical maps of the environment.

Many different learning methods may be applied to solve the above problems. The ball robot system considered here contains one or several learning modules based on the following methods:

1) Conventional supervised learning for learning tasks where the desired actuator signals are provided by one or several human supervisors (teachers). Possible examples here are learning to balance the main axis in a horizontal direction, robot localization, object recognition, path following, object avoidance.
2) Reinforcement learning and artificial evolution methods for learning tasks where the only information available consist of sensor readings and a scalar performance measure to be optimized which may be stochastic as well as delayed. This kind of learning is generally slow in comparison to conventional supervised learning but makes it possible to avoid any human interaction in the robot learning process.
3) Unsupervised learning for various pre-processing tasks such as sensor data compression and probability density estimation. However, this kind of unsupervised learning may be regarded as subparts in a supervised and/or reinforcement learning context and/or may be regarded as self-learning or self-organizing sensor systems.

Although essentially all learning methods considered for conventional robots have been based on artificial neural networks (ANNs), in the ball robot system disclosed here, the learning methods are not at all limited to ANNs. Besides ANNs, there are many other possibilities to create conventional supervised learning. Examples of such possibilities include multivariate splines, projection pursuit, regression and decision trees, prototype based regression and classification, parametric and non-parametric statistical multivariate regression and classification, learning automata, hidden markov models, and adaptive fuzzy systems. We are not aware of any comprehensive material on this broad range of possibilities recent textbooks like "The Elements of Statistical Learning" by Hastie, Tibshirani and Friedman and "Machine Learning" by Mitchell offer some of the broadest overviews known. In the field of reinforcement learning and artificial evolution, the literature is even more scattered. Recent textbooks are "Neuro-dynamic programming" by Bertsekas and "Reinforcement Learning" by Sutton and Barto which show that the implementations of reinforcement learning does not have to rely entirely on ANNs. A third important classical reference is the work by John Holland on "Classifier Systems" and the "bucket brigade algorithm" which is one early form of reinforcement learning and contains the foundations of genetic algorithms.

As indicated in FIG. 18, the learning system takes sensor outputs as inputs and produces actuator signals as outputs. The sensor signals consists of lists of various forms or more or less compressed features representing the state of the environment and the robot dynamics including the present state of the actuators such as position and speed of the motors. The sensor signals also include learning signals with different levels of quality and detail. In conventional supervised learning, the sensor signals consist of an array of desired actuator readouts that the learning system should learn to (re)produce. In reinforcement learning and artificial evolution (genetic algorithms, evolutionary robotics), the training signals come in the form of delayed and stochastic scalar performance information that are used to design new generations of more successful systems. In artificial evolution methods, there are no traditional teaching algorithms. Instead a population of candidate solutions to the sensor-actuator mapping is evaluated and new candidate solutions are based on the most promising solutions in the present generation. In reinforcement learning, the standard solution is to estimate a value function that predicts the expected future reward from the environment conditioned on the present deterministic or stochastic sensor-actuator mapping (policy). Based on the continuously updated estimated value function, improved sensor-actuator mappings are realized that tend to increase the expected accumulated reward.

As indicated above, there is a great body of literature available and the particular solutions selected will depends on the tasks to be conducted by the ball robot and the particular sensors and sensor pre-processing system available. Thus, the key invention here is the inclusion of learning subsystems for ball robot operational systems which makes the robots become more practically useful in various ways. Some examples of significant values added, in comparisons with prior art in the field of spherical robots, are:
1) Simpler steering by a human operator via self-balancing of the main axis and self-learning of the spherical dynamics.
2) No need for nontrivial and computational demanding physical modelling of the robot dynamics (via analytical mechanics) for robot control
3) Simpler realization of robust path following for e.g. surveillance tasks
4) Simplified and improved recognition performance for objects and humans.
5) User-friendly access to obstacle avoidance.
6) Robust localization of robot based on a combination of GPS sensor readouts and local sensor input features.
7) Concrete possibilities to obtain various degrees of autonomous behaviour that will be perceived as intelligent behaviour by a human observer (like in autonomous search and recognition of objects and humans).

The invention claimed is:
1. A ball robot, comprising:
a spherical shell;
a diametric main axle;
at least one pendulum pivotally coupled to the main axle; and
a drive mechanism for driving said pendulum(s) comprising at least a primary drive motor and a secondary drive motor, wherein the drive motors are arranged on the pendulum(s) in a vicinity of an inner surface of the shell, the primary motor is arranged to drive said pendulum(s) for rotation about said main axis, and the secondary motor is arranged to drive said pendulum for rotation about a secondary axis.

2. The ball robot according to claim 1 wherein the primary motor is arranged at a lower portion of a primary pendulum, in the vicinity of the inner surface of the shell, the primary pendulum being rotatably supported by the diametric main axle at an upper end, and the primary motor being arranged to drive the primary pendulum for rotation about the main axle by a primary transmission arrangement, wherein
the drive mechanism further comprises a secondary pendulum and the secondary motor for driving the secondary pendulum for rotation about a secondary axle transverse to the main axle and attached to the primary pendulum, and wherein the secondary motor is arranged at a lower portion of the secondary pendulum, in the vicinity of the inner surface of the shell, and the secondary motor being arranged to drive the secondary pendulum for rotation about the secondary axle by a secondary transmission arrangement.

3. The ball robot according to claim 2 wherein the drive mechanism comprises two secondary pendulums, arranged on the secondary axis, one on each side of the main axis.

4. The ball robot according to claim 2 wherein the ball robot further comprises a power supply (battery) and a control system, all arranged at the lower portion of the secondary pendulum, in the vicinity of the inner surface of the shell.

5. The ball robot according to claim 4 wherein the power supply and the control system are arranged on a rotation element which is rotatable about the lateral axis of the secondary pendulum.

6. The ball robot according to claim 1 wherein the drive mechanism comprises the primary and secondary drive motors arranged on a drive pendulum in the vicinity of the inner surface of the shell, the primary motor being arranged to drive the drive pendulum for rotation about the main axle by a primary transmission arrangement and the secondary motor being arranged to drive the drive pendulum for rotation about a secondary axle transverse to the main axle by a secondary transmission arrangement.

7. The ball robot according to claim 6 wherein the drive mechanism comprises a third drive motor arranged on a second drive pendulum in the vicinity of the inner surface of the shell, the third motor being arranged to drive the second drive pendulum for rotation about the secondary axle by a third transmission arrangement.

8. The ball robot according to claim 1, further comprising a self learning system control system.

9. A ball robot, comprising:
a ball shaped shell;
a diametric axle attached to the shell concentric with a main axis of rotation of the shell; and
a drive mechanism located inside the shell and supported by the diametric axle,
wherein the diametric axle is arranged to accommodate for dimensional changes of the shell along the main axis of rotation.

10. The ball robot according to claim 9 wherein the diametric axle is a telescopic axle.

11. The ball robot according to claim 10 wherein the telescopic axle comprises two end sections being secured to the shell and a mid section carrying the drive mechanism, wherein the mid section being arranged so that it cannot rotate with respect to the end sections, e.g. by splines.

12. The ball robot according to claim 9 wherein the diametric axle is attached to the shell by at least one member.

13. The ball robot according to claim 9 wherein the diametric axle is a hollow tube being arranged to house additional sensor and/or actuator means (equipment) carried by the robot.

14. The ball robot according to claim 13 wherein the tube has a circular, rectangular or polygonal cross sectional shape.

15. The ball robot according to claim 13 wherein the tube is provided with a fastening structure and the additional equipment with a mating structure.

16. The ball robot according to claim 13 wherein the additional equipment is powered by a main power source in the robot.

17. The ball robot according to claim 16 wherein the tube is provided with a power source interface for conducting electrical power to the additional equipment.

18. The ball robot according to claim 13 wherein the robot is provided with a main computer and a communication interface for communication between the main computer and the additional equipment.

19. The ball robot according to claim 18 wherein the communication interface is wireless.

20. The ball robot according to claim 18 wherein the communication interface is a wire with a communication interface connection in the tube and a mating connection on the additional equipment.

21. The ball robot according to claim 13 wherein the tube forms an extension of an opening in the shell.

22. The ball robot according to claim 13 wherein the tube connects two openings in the shell, whereby the shell and the tube together form a closed structure enclosing an inner volume housing the drive mechanism.

23. The ball robot according to claim 22 wherein the ball robot further comprises end caps arranged at the openings in the shell.

24. The ball robot according to claim 23 wherein the end caps are extendable with respect to the openings in the shell.

25. The ball robot according to claim 23 wherein the end caps are provided with antennas for the wireless communication system.

26. The ball robot according to claim 9, further comprising a self learning system control system.

* * * * *